United States Patent

Otsubo et al.

[11] Patent Number: 5,758,305
[45] Date of Patent: May 26, 1998

[54] SYSTEM FOR DETECTING FRICTIONAL STATE OF RUNNING ROAD SURFACE

[75] Inventors: Hideaki Otsubo, Susono; Yasunori Nakawaki, Aichi-ken, both of Japan

[73] Assignee: Toyota Jidosha Kabushiki Kaisha, Toyota, Japan

[21] Appl. No.: 546,159

[22] Filed: Oct. 20, 1995

[30] Foreign Application Priority Data

Oct. 25, 1994 [JP] Japan .................. 6-260138

[51] Int. Cl.$^6$ ........................ B60T 8/32
[52] U.S. Cl. ............... 701/71; 701/73; 303/150
[58] Field of Search ............. 364/424.045, 426.01, 364/426.015, 426.017, 426.025; 180/197; 303/149, 150

[56] References Cited

U.S. PATENT DOCUMENTS

| | | | |
|---|---|---|---|
| 3,861,756 | 1/1975 | Arikawa | 303/182 |
| 4,770,226 | 9/1988 | Yamaguchi et al. | 180/197 |
| 4,936,636 | 6/1990 | Matsuda | 303/157 |
| 5,092,662 | 3/1992 | Okubo | 303/150 |
| 5,123,715 | 6/1992 | Okubo | 303/150 |
| 5,257,857 | 11/1993 | Okazaki | 303/163 |
| 5,292,187 | 3/1994 | Onaka et al. | 303/157 |
| 5,443,583 | 8/1995 | Sugawara et al. | 303/169 |
| 5,444,625 | 8/1995 | Tanaka et al. | 364/426.036 |

FOREIGN PATENT DOCUMENTS

1-238747  9/1989  Japan.

*Primary Examiner*—Michael Zanelli
*Attorney, Agent, or Firm*—Oblon, Spivak, McClelland, Maier, & Neustadt, P.C.

[57] ABSTRACT

In order to correctly detect the frictional state of a running road surface, the running road surface is determined as a low-friction road surface, when tire lock is detected by tire lock detection device, and besides a state in which vehicle deceleration obtained by vehicle deceleration detection means is greater than a predetermined value, is shorter than a predetermined time in a period extending from the start of braking until the tire lock.

3 Claims, 5 Drawing Sheets

FIG.3

| SHIFT POSITION | | $C_1$ | $C_2$ | $C_0$ | $B_1$ | $B_2$ | $B_3$ | $B_0$ | $F_1$ | $F_2$ | $F_0$ |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | ○ | | | | ◎ | ◎ |
| L | 2 | ○ | | ○ | ○ | ○ | | | ◎ | | ◎ |

MARK ◎ : ACTUATED WHEN DRIVING ONLY.

1

SYSTEM FOR DETECTING FRICTIONAL STATE OF RUNNING ROAD SURFACE

BACKGROUND OF THE INVENTION

1. Field of the Invention

The present invention relates to a system for detecting a frictional state of a road surface on which the motor vehicle is running.

2. Description of the Prior Art

There has hitherto been known a control technique which detects whether the running road surface of a motor vehicle has a low-μ (low-friction coefficient) road surface or a high-μ (high-friction coefficient) road surface, and which alters the shift pattern of a transmission in accordance with the state of the road surface. By way of example, Japanese Patent Application Laid-open No. 238747/1989 discloses the control technique wherein, when detecting that the road surface is the low-μone, a shift pattern for the low-μ road surface is selected to carry out a gear shifting according to the selected shift pattern.

Regarding the detection of the frictional state of the running road surface, the aforementioned patent application proposes a technique wherein the deceleration of the motor vehicle during braking is detected from the rotational speed of a rotating member included in a power transmission path, and the detected vehicle deceleration is compared with a predetermined value so as to detect tire lock, then, if the tire lock is detected, the road surface is considered as the low-μ one.

Thus, the prior-art system detects whether the running road surface is the low-μ one or the high-μ one, merely in accordance with the presence or absence of the tire lock. In some cases, however, the tire lock occurs even on the high-μ road surface, depending upon a braking force. Accordingly, the prior-art system has the problem that the running road surface might be erroneously detected as the low-μ one in spite of the high-μ one, so the reliable detection of the frictional state is not always ensured.

SUMMARY OF THE INVENTION

The present invention has been made in order to solve the problem of the prior art as stated above, and has for its object to provide a system for detecting the frictional state of a running road surface, which can detect a low-μ road surface or a high-μ road surface more correctly.

The present invention has achieved above object by adopting the structure as defined in claims 1 to 3. Main structure of claims 1 and 2 are shown FIGS. 1A and 1B, respectively.

As data supporting the functions of the present invention, a vehicle deceleration on a high-μ road surface (asphalt road surface) is exemplified in FIG. 5, and a vehicle deceleration on a low-μ road surface (icy road surface) is exemplified in FIG. 6. A braking force is greater on the asphalt road surface than on the icy road surface. In FIG. 5, a solid line corresponds to a case where tire lock is not detected on the high-μ road surface, and a broken line to a case where it is detected. In both the cases of the high-μ road surface, comparatively great deceleration is detected for a considerably long time (for a time t1 indicated in FIG. 5).

On the other hand, FIG. 6 illustrates a case where tire lock is detected on the low-μ road surface. Very great deceleration is detected in the case of the low-μ road surface, but yet, the duration of such a state is very short (only a time t2 indicated in FIG. 6). Incidentally, the acceleration (deceleration) in each of FIGS. 5 and 6 has been obtained on the basis of the average of the wheel speeds of rear right and left wheels.

In this manner, regarding the low-μ road surface, in the process from the start of braking to the tire lock, the vehicle deceleration increases abruptly from a comparatively small value and keeps large values for only the short time until the tire lock.

In the present invention as defined in claim 1, therefore, the process from the start of the braking to the tire lock is taken into consideration, and the running road surface is determined as the low-friction road surface, according to the detection of the tire lock and to the detection that the state in which the vehicle deceleration during the braking is greater than the predetermined value is shorter than the predetermined time. It is accordingly possible to detect the low-μ road surface more correctly.

To the contrary, if the state in which the vehicle deceleration is comparatively great has been detected for the considerably long time, then the high-μ road surface can be determined. The reason therefor is that such a phenomenon could never be presented on the low-μ road surface.

In the present invention as defined in claim 2, therefore, such a changing process of the vehicle deceleration during braking is taken into consideration, and the running road surface is determined as the high-friction road surface, according to the detection that the state in which the vehicle deceleration during the braking is greater than the predetermined value, is longer than the predetermined time. It is accordingly possible to detect the high-μ road surface more correctly. Incidentally, the tire lock need not always be detected in the detection of the highs road surface. The predetermined value and the predetermined time in each of claims 1 and 2 (first and second predetermined values and first and second predetermined times in claim 3) need not be fixed identical or constant magnitudes, but they may well be changed in accordance with the purpose of the detection of the frictional state of the road surface (what control is going to carry out using the detected frictional state) etc., respectively. In general, the predetermined value and the predetermined time for detecting the high-p road are greater in magnitudes than those for detecting the low-μ road decision.

Incidentally, in the case where both low-friction road detecting condition and high-friction road detecting condition are not satisfied, the preceding determination of the frictional state of the running road surface may well be maintained as newly determined frictional state of the running road surface. (claim 3)

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 3 is a table showing the engagement states of frictional engagement elements in the automatic transmission depicted in FIG. 2;

DETAILED DESCRIPTION OF THE PREFERRED EMBODIMENT

Now, an embodiment of the present invention will be described in detail with reference to the drawings.

Figure 1A:
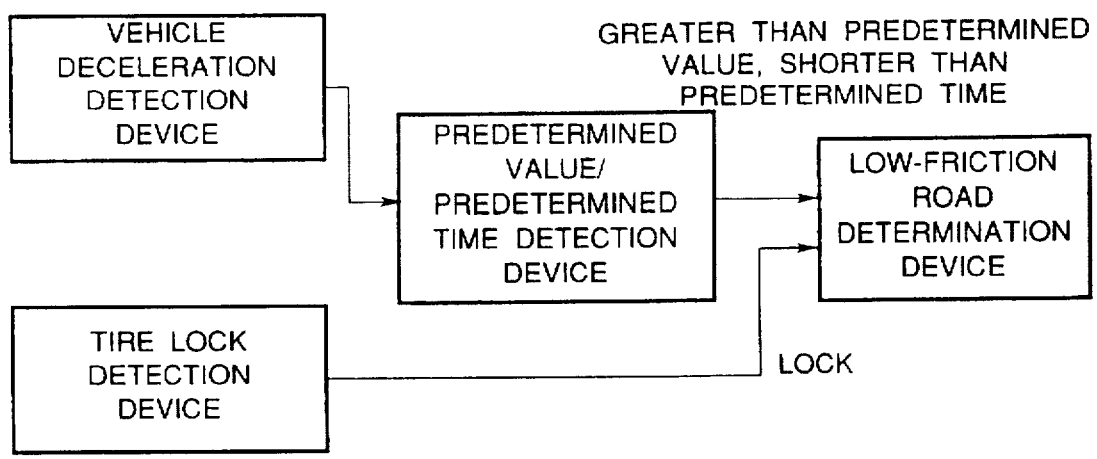
FIGS. 1A and 1B are block diagrams each showing the main gist of the present invention.
Figure 1B:
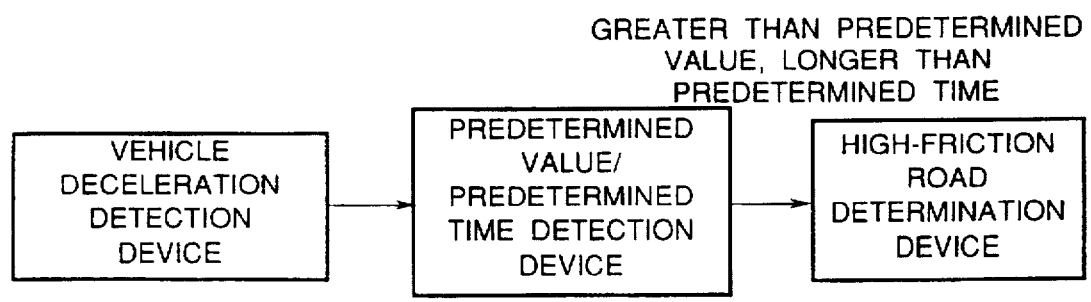
Figure 2:
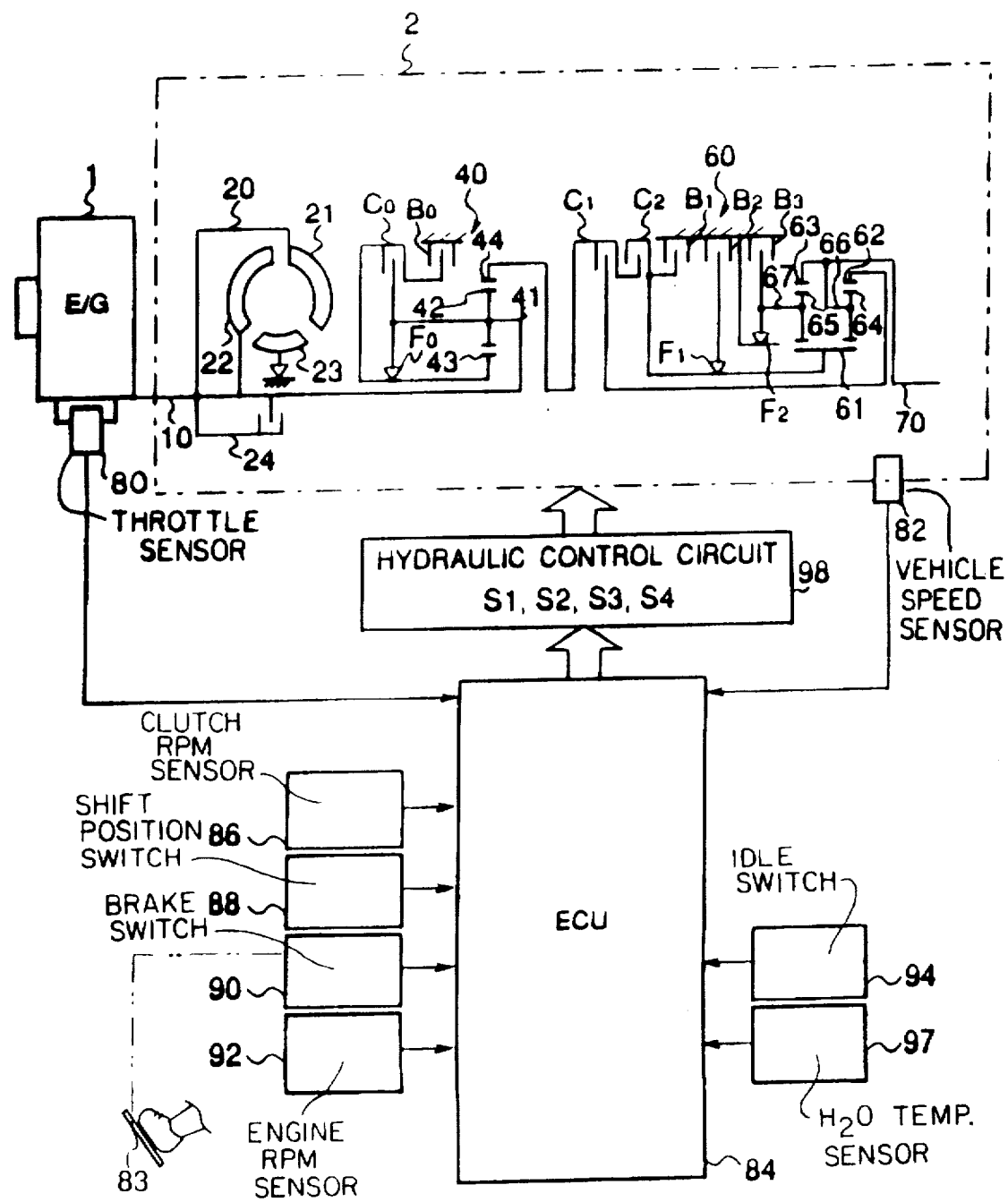
FIG. 2 is a block diagram showing the schematic construction of an automatic transmission for a motor vehicle which includes a frictional-condition detection system, and to which the present invention is applied.

FIG. 2 is a general diagram of an automatic transmission which is combined with an electronic fuel injection engine for an automobile, and to which the present invention is applied.

The automatic transmission has a torque converter portion 20, an overdrive mechanism portion 40, and an underdrive mechanism portion 60 furnished with three forward gears and one reverse gear.

The torque converter portion 20 is a well-known one including a pump 21, a turbine 22, a stator 23 and a lockup clutch 24. The torque convertor portion 20 transmits the output of the crankshaft 10 of the engine 1 to the overdrive mechanism portion 40.

The overdrive mechanism portion 40 includes one set of planetary gears which consist of a sun gear 43, a ring gear 44, a planetary pinion 42 and a carrier 41. The rotational state of the planetary gears is controlled by a clutch C0, a brake B0 and a one-way clutch F0.

The underdrive mechanism portion 60 includes two sets of planetary gears which consist of a common sun gear 61, ring gears 62, 63, planetary pinions 64, 65 and carriers 66, 67. The rotational states of the two sets of planetary gears, and the connection states thereof with the overdrive mechanism portion 40 are controlled by clutches C1, C2, brakes B1-B3 and one-way clutches F1, F2.

A computer 84 for controlling the automatic transmission is supplied with signals for various controls from sensors and switches. More specifically, the computer 84 is supplied with signals from: a throttle sensor 80 which detects the opening degree (θ) of a throttle valve for reflecting the load of the engine 1; a sensor for the r.p.m. (revolutions per minute) of the output shaft 70 of the automatic transmission, as a vehicle speed sensor 82 which detects the vehicle speed (No) of the automobile; a sensor 86 which detects the r.p.m. (NCO) of the clutch C0; a shift position switch 88 which delivers a shift position signal; a brake switch 90 which produces a signal while a foot brake pedal 83 is stepped on; a Ne sensor 92 which detects the r.p.m. (Ne) of the engine 1; an idle switch 94 which produces a state signal of an idle contact ("OFF" when the accelerator pedal of the automobile is pressed or stepped on, and "ON" when it is released or eased up); a water temperature sensor 97 which detects the temperature (T) of the cooling water of the engine 1.

In this embodiment, the information (No) of the vehicle speed sensor 82 is also used for evaluating the vehicle deceleration (g).

Using the input signals from the sensors and the switches as parameters, the computer 84 drives and controls solenoid valves S1, S2, S3 and S4 included in a hydraulic control circuit 86, in conformity with one of preset shift-point maps consisted of the throttle opening degree (θ) and the vehicle speed (No). Thus, the gear shifting of the automatic transmission is controlled according to the combinations of the engagements of the clutches, brakes etc. as tabulated in FIG. 3.

In the table of FIG. 3, letters P, R and N denote parking, reverse and neutral positions, respectively. A drive position "D" includes the first gear through the fourth gear (overdrive gear stage). A second gear position "2" includes the first gear, the second gear in which engine brake is available, and the third gear from which a downshift is allowable, and to which an upshift is not allowable. A low gear position "L" includes the first gear in which engine brake is available, and the second gear from which a downshift is allowable, and to which an upshift is not allowable.

Besides, the computer 84 detects the frictional state of a road surface on which the motor vehicle is running. The detection is executed in conformity with a flow chart as illustrated in FIG. 4.

Figure 4:
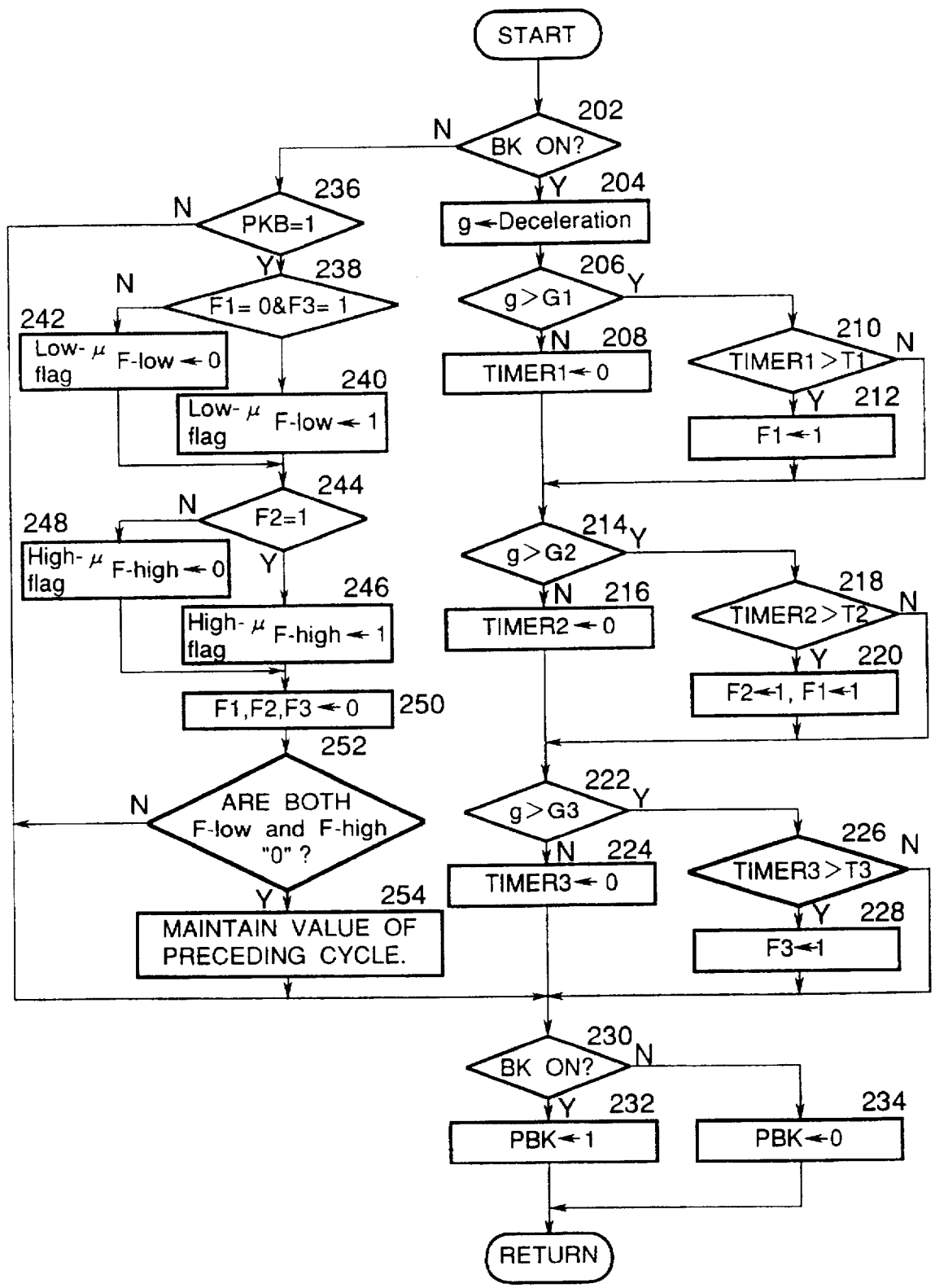
FIG. 4 is a flow chart showing the flow of processing in an embodiment of the present invention.
Figure 5:
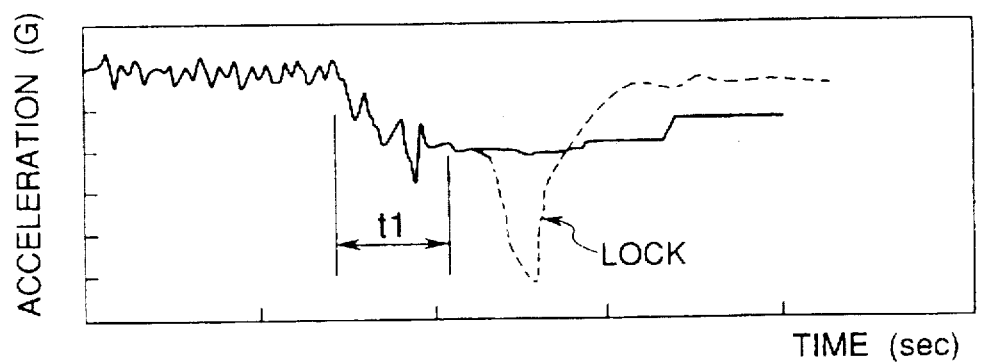
FIG. 5 is a graph showing an example of the acceleration (deceleration) of a motor vehicle during braking on a highs road surface.
Figure 6:
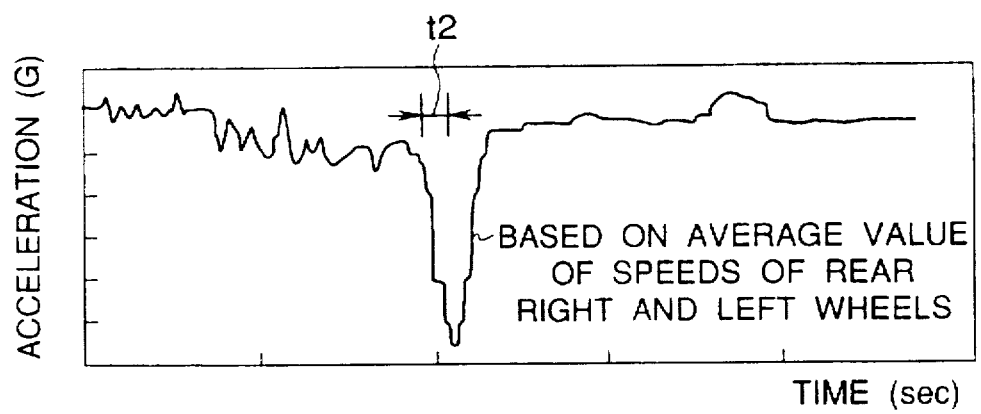
FIG. 6 is a graph showing an example of the acceleration (deceleration) of the motor vehicle during braking on a low-μ road surface.

Upon the start of the flow of processing shown in FIG. 4, whether or not the brake pedal 83 is stepped on is detected by the brake switch 90 at the first step 202. When the brake pedal 83 is stepped on, the processing flow proceeds to a step 204, at which the vehicle deceleration g is calculated on the basis of the information No from the vehicle speed sensor 82.

Subsequently, at a step 206, it is detected whether or not the vehicle deceleration g is greater than a first predetermined value G1 (corresponding to a "predetermined value" mentioned in claim 1), that is, whether or not g>G1 is satisfied. When the deceleration g is not greater than the value G1, the processing flow proceeds to a step 208. Here at the step 208, a TIMER1 for measuring the time or duration of a state in which the deceleration g is greater than the value G1 is cleared to "0" (zero).

On the other hand, when the deceleration g is greater than the value G1, the processing flow proceeds to a step 210. At the step 210, it is detected whether or not the TIMER1 (of the state in which the deceleration g is greater than the value G1) is longer than a first predetermined time T1 (corresponding to a "predetermined time" mentioned in claim 1), that is, whether or not TIMER1>T1 is satisfied. When TIMER1>T1 is held, a flag F1 for deciding that the deceleration is low is set to "1" (one) at a step 212, and when not, the step 212 is skipped. After the step 212, or the step 210 in the case where TIMER1>T1 is not held, the processing flow proceeds to a step 214.

At the step 214, it is detected whether or not the vehicle deceleration g is greater than a second predetermined value G2 (corresponding to a "predetermined value" mentioned in claim 2), that is, whether or not g>G2 is satisfied. When the deceleration g is not greater than the value G2, a TIMER2 for measuring the time or duration of a state in which the deceleration g is greater than the value G2 is cleared to "0" at a step 216. On the other hand, when the deceleration g is greater than the value G2, the processing flow proceeds to a step 218. At the step 218, it is detected whether or not the TIMER2 (of the state in which the deceleration g is greater than the value G2) is longer than a second predetermined time T2 (corresponding to a "predetermined time" mentioned in claim 2), that is, whether or not TIMER2>T2 is held. When TIMER2>T2 is held, the next step 220 functions to set to "1" both the flag F1 for determining that the deceleration is low and a flag F2 for determining that the deceleration is high. When the TIMER2>T2 is not held, the step 220 is skipped. After the step 220, or the step 218 in the case where TIMER2>T2 is not held, the processing flow proceeds to a step 222.

In the step 222, it is detected whether or not the vehicle deceleration g is greater than a third predetermined value G3, that is, whether or not g>G3 is satisfied. The third predetermined value G3 is used for detecting tire lock. When the deceleration g is not greater than the value G3, a TIMER3 for measuring the time or duration of a state in which the deceleration g is greater than the value G3 is cleared to "0" at a step 224. On the other hand, when the deceleration g is greater than the value G3, the processing flow proceeds to a step 226 so as to detect whether or not the TIMER3 (of the state in which the deceleration g is greater than the value G3) is longer than a third predetermined time T3, that is, whether or not TIMER3>T3 is held. When TIMER3>T3 is held, the occurrence of the tire lock is determined, and a flag F3 for determining the tire lock is set to "1" at a step 228. When TIMER3>T3 is not held, the step 228 is skipped. After the step 228, or the step 226 in the case where TIMER3>T3 is not held, the processing flow proceeds to a step 230.

At the step 230, whether or not the brake pedal 83 is stepped on, is detected. When the brake pedal 83 is stepped on, a value of a flag PBK for indicating a brake state in the "preceding cycle" of the processing flow is set to "1" at a step 232. The flag PBK is used at a step 236 in the succeeding cycle thereof. When the brake pedal 83 is not stepped on, the flag PBK is set to "0" at step 234. After the steps 232 or 234, the processing flow is returned.

After the return, when it is detected at the step 202 that the brake pedal 83 is not stepped on, the processing flow proceeds to the step 236. This step 236 functions to detect whether or not PBK=1 is held, that is, whether or not the brake pedal 83 had been stepped on until the preceding cycle, and has just been released in the present cycle. According to the resulting detection that the brake pedal 83 has just been released, the processing flow proceeds to a step 238. At the step 238 and thereafter, whether the running road surface of the motor vehicle is the low-μ one or the high-μ one is detected.

More specifically, the flags F1 and F3 are checked at the step 238. When both F1=0 and F3=1 is held, the low-μ road surface is determined because F3=1 indicates the occurrence of the tire lock, while F1=0 indicates that the state in which the vehicle deceleration g is greater than the predetermined G1 (in claim 1) is shorter than the predetermined time T1 (in claim 1). In this case, a low-μ flag F-low is set to "1" at the step 240. Besides, in any other case where both F1=0 and F3=1 are not held at the step 238, the low-μ flag F-low is cleared to "0" at the step 242.

At the next step 244, whether or not F2 =1 is checked. When F2=1 is held, the high-μ road surface is determined because this flag F2 indicates that the state in which the vehicle deceleration g is greater than the predetermined G2 (in claim 2) is longer than the predetermined time T2 (in claim 2). Accordingly, a high-μ flag F-high is set to "1" at the step 246. Besides, when F2=1 is not held at the step 244, the high-μ flag F-high is cleared to "0" at the step 248. At the next step 250, all the flags F1, F2 and F3 are cleared to "0". Subsequently, the low-μ flag F-low and the high-μ flag F-high are checked at the step 252. When both the flags F-low and F-high are detected "0", neither the determination of the low-μ road surface nor that of the high-p road surface has been (positively) rendered, therefore, the results of the preceding cycle are maintained at the step 254. On the other hand, when either the low-μ flag F-low or the highs flag F-high is detected "1" at the step 252, the step 254 is skipped. After the step 254, or the step 252 in the case where either of the flags F-low, F-high is detected "1", the processing flow proceeds to the step 230.

Meanwhile, when PBK=1 is not held in the detection of the step 236, the brake pedal 83 has been released before. Therefore, the processing flow proceeds to the step 230 without detecting the low-μ road surface or the high-μ road surface. Thereafter, similar processing is repeated.

In this manner, with this embodiment, the frictional state of the running road surface is not detected merely in accordance with the presence or absence of the tire lock, but it is detected by considering also the process from the start of the braking until the tire lock. Therefore, the low-μ road surface or the highs road surface can be detected more correctly. By the way, in this embodiment, the tire lock is detecting using the threshold value of the predetermined value (deceleration) G3. However, the tire lock detecting method is not limited thereto, but the tire lock can also be detected from, for example, a wheel speed itself obtained with a wheel speed sensor. As thus far described, according to this embodiment, a process from the start of braking until tire lock, in other words, the situation of change of a vehicle deceleration during the braking is taken into consideration, so that a low-μ road surface or a high-μ road surface can be detected more correctly.

What is claimed is:

1. A system for detecting a frictional state of a running road surface, having means for detecting vehicle deceleration from a rotational speed of a rotating member included in a power transmission path, wherein whether or not the running road surface is a low-friction road surface is detected on the basis of the vehicle deceleration during braking, comprising:

a braking detector;

means for detecting tire lock;

means for detecting-a state in which said vehicle deceleration during braking is greater than a predetermined value, and means for determining whether said detected state lasts for shorter than a predetermined time during a period extending from start of said braking until the detection of the tire lock; and low-friction road determination means for determining said running road surface as the low-friction road surface when said tire lock is detected and said state is determined to have lasted for shorter than the predetermined time during said period.

2. A system for detecting a frictional state of a running road surface, having means for detecting vehicle deceleration from a rotational speed of a rotating member included in a power transmission path, wherein whether or not the running road surface is a high-friction road surface is detected on the basis of the vehicle deceleration during braking, comprising:

a braking detector;

means for detecting tire lock;

means for detecting a first state in which said vehicle deceleration during the braking is greater than a first predetermined value, and means for determining whether said detected first state lasts for shorter than a first predetermined time during a period extending from start of said braking until the detection of the tire lock;

low-friction road determination means for determining said running road surface as the low-friction road surface when said tire lock is detected said first state is determined to have lasted for shorter than the first predetermined time during said period;

means for detecting a second state in which said vehicle deceleration during the braking is greater than a second predetermined value, and means for determining whether or not said detected second state continues for longer than a second predetermined time; and high-friction road determination means for determining said running road surface as the high-friction road surface when the second state is determined to have continued for longer than the second predetermined time.

3. A system for detecting a frictional state of a running road surface, having means for detecting vehicle deceleration from a rotational speed of a rotating member included in a power transmission path, wherein whether or not the running road surface is a low-friction road surface is detected on the basis of the vehicle deceleration during braking, comprising:

a braking detector;

means for detecting tire lock;

means for detecting a first state in which said vehicle deceleration during the braking is greater than a first predetermined value, and means for determining whether said detected first state lasts for shorter than a first predetermined time during a period extending from start of said braking until the detection of the tire lock;

low-friction road determination means for determining said running road surface as the low-friction road surface when said tire lock is detected and said first state is determined to have lasted for shorter than the first predetermined time during said period;

means for detecting a second state in which said vehicle deceleration during the braking is greater than a second predetermined value, and means for determining whether or not said detected second state continues for longer than a second predetermined time; and high-friction road determination means for determining said running road surface as the high-friction road surface when the second state is determined to have continued for longer than the second predetermined time wherein;

in the case where both low-friction road detecting condition and high-friction road detecting condition are not satisfied, the preceding determination of the frictional state of the running road surface is maintained as a newly determined frictional state of the running road surface.

\* \* \* \* \*